United States Patent

[11] 3,586,945

| [72] | Inventors | Kingston E. Ganske;<br>Jerry O. Kelley, both of Columbus, Ind. |
|---|---|---|
| [21] | Appl. No. | 705,406 |
| [22] | Filed | Feb. 14, 1968 |
| [45] | Patented | June 22, 1971 |
| [73] | Assignee | Arvin Industries, Inc.<br>Columbus, Ind. |

[54] MULTI-SPEED SYNCHRONOUS MOTOR DRIVE
4 Claims, 5 Drawing Figs.

[52] U.S. Cl. ................................................. 318/325,
318/305, 318/166
[51] Int. Cl. ....................................................... H02p 5/08
[50] Field of Search............................................. 318/305,
325, 327, 346, 166, 182, 230

[56] References Cited
UNITED STATES PATENTS

| 2,831,068 | 4/1958 | Boggs............................ | 318/325 |
|---|---|---|---|
| 3,143,695 | 8/1964 | Hohne, Jr. et al............. | 318/325 |
| 3,172,028 | 3/1965 | Dechet.......................... | 318/327 |
| 3,184,671 | 5/1965 | Riggs............................. | 318/325 |
| 3,221,236 | 11/1965 | School.......................... | 318/325 |
| 3,286,150 | 11/1966 | Wilson et al. ................. | 318/305 |
| 3,317,807 | 5/1967 | Dorfner et al. ................ | 318/325 |
| 3,317,808 | 5/1967 | Tott............................... | 318/346 |
| 3,381,199 | 4/1968 | Persson ......................... | 318/327 |
| 3,422,330 | 1/1969 | Swanke ......................... | 318/305 |
| 762,738 | 6/1904 | Meyer............................ | 318/230 |
| 1,961,776 | 6/1939 | Morrill .......................... | 318/166 |
| 2,265,931 | 12/1941 | Tarbox .......................... | 318/231 |
| 2,370,078 | 2/1945 | Schaelchlin ................... | 318/231 |
| 2,454,778 | 11/1948 | Curry ............................ | 318/182 |

*Primary Examiner*—Oris L. Rader
*Assistant Examiner*—Thomas Langer
*Attorney*—Marechal, Biebel, French and Bugg ABSTRACT: A synchronous hysteresis electric motor operates at its synchronous speed to drive a load such as the capstan in a magnetic recording system. A separate power supply circuit to the synchronous motor includes a motor speed sensitive feedback control such as a governor operated switch, which interrupts the power supply to the motor whenever the motor exceeds a predetermined speed lower than synchronous speed, and restores the power supply as soon as the motor slows beyond the lower speed.

PATENTED JUN22 1971
3,586,945
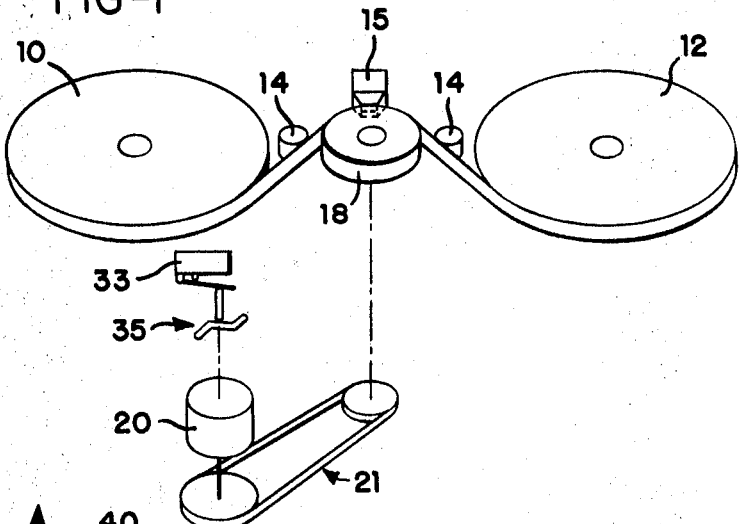
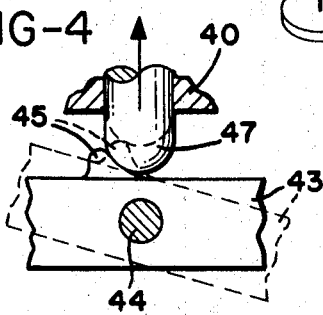
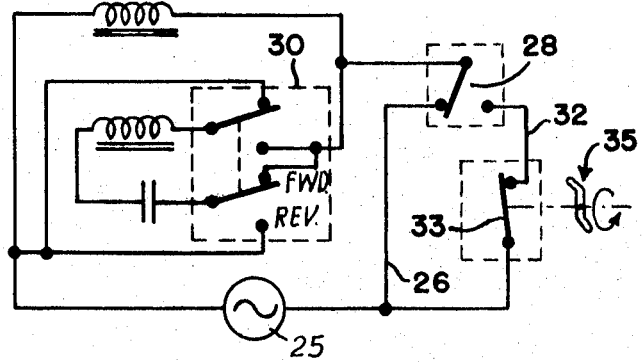
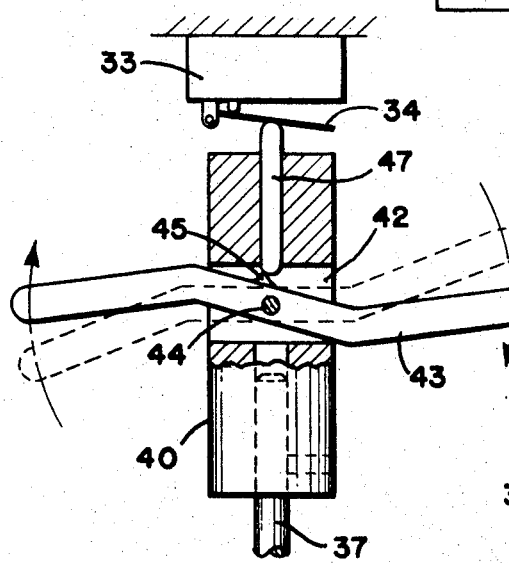
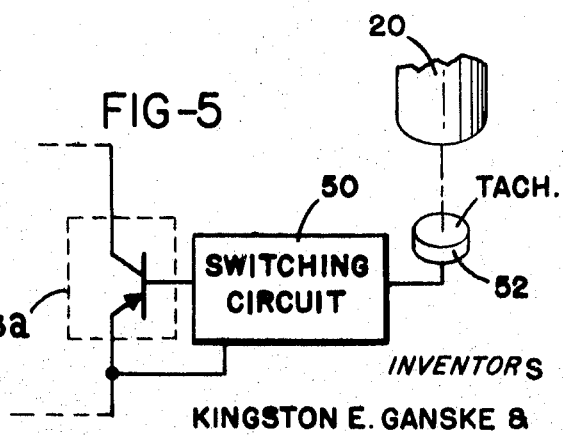
INVENTORS
KINGSTON E. GANSKE &
JERRY O. KELLEY
BY
Marechal, Biebel, French & Bugg
ATTORNEYS

MULTI-SPEED SYNCHRONOUS MOTOR DRIVE

BACKGROUND OF THE INVENTION

This invention relates to speed controls for synchronous hysteresis electric motors, which are of the self-starting-type, particularly as applied to the drive system of magnetic recording equipment or similar devices, where a tape is transported at relatively high speed from a supply to a takeup. Various forms of speed controls have been proposed for such systems, but in general these involve the use of a different motor for lower speed, or the use of some form of change speed transmission, or the use of an electronic speed control involving the changing of the frequency of the AC supply to the synchronous motor. Each of these arrangements has a corresponding disadvantage due to complexity, cost, or unreliability.

SUMMARY OF THE INVENTION

The present invention provides a simple, reliable, and relatively inexpensive speed control for a self-starting synchronous electric motor, wherein the normal AC power supply circuit to the motor is disconnected for lower speed operation, and a separate lower speed supply circuit is employed including a feedback control responsive to the motor speed. In one simple embodiment of the invention this feedback control includes a normally closed governor switch which is opened by a governor driven from the synchronous motor, whenever the motor exceeds the predetermined lower speed desired. This results in slowing of the motor and consequent closing of the governor switch to complete again the lower speed supply circuit. By proper selection of the governor and governor switch parts, the synchronous motor will operate at the lower speed without appreciable hunting. This lower speed may be used, for example, in conjunction with self-threading operations in a magnetic tape recording system.

The primary object of the invention, therefore, is to provide a novel slow speed control for a self-starting synchronous motor, such as a hysteresis electric motor, in which a low speed power supply circuit includes a motor speed sensitive feedback arrangement that interrupts the power supply to the motor whenever it exceeds the predetermined lower speed; to provide such an arrangement wherein the feedback control includes a flyweight governor driven from the motor and connected to operate a governor switch, and thus to interrupt the low speed power supply circuit; to provide such an arrangement wherein the synchronous motor can be operated at lower speed in either forward or reverse direction of rotation; and to provide a simple, relatively inexpensive, low speed control which can readily be adapted to synchronous motors.

Other objects and advantages of the invention will be apparent from the following description, the accompanying drawings and the appended claims.

In the drawings:

FIG. 1 is a schematic diagram showing a typical magnetic recording system incorporating the slow speed control of the present invention in the synchronous motor drive for the capstan; FIG. 2 is a simplified schematic diagram showing the electrical supply circuits for the synchronous motor in normal and slower speed, and in forward or reverse operation;

FIG. 3 is a sectional view illustrating the mechanical governor driven from the motor shaft, together with the governor switch operated thereby;

FIG. 4 is an enlarged fragmentary view of the governor; and

FIG. 5 is a diagram of a modification of the circuit shown in FIG. 2.

DESCRIPTION OF THE PREFERRED EMBODIMENTS

Referring to FIGS. 1 and 2 which illustrate a preferred embodiment of the invention, the slow speed control is illustrated in a typical use, employed as part of the drive of a magnetic recording system. This system includes a supply in the form of a reel 10 and takeup in the form of a reel 12. It will be understood by those skilled in the art that the supply and takeup may include provisions, such as small motors and friction clutches (not shown) for assuring that neither is overrun by the drive, and that the tape is maintained at proper tension. The magnetic recording media in the form of a tape 13 passes from the supply to the takeup, past suitable guides, which may take the form of guide rollers 14 and additional guide tracks (not shown) for locating the tape in a predetermined path.

Along this path there is at least one transducer, such as a magnetic recording and /or playback head 15, and in the embodiment shown this transducer is mounted to contact the tape opposite the drive capstan 18, with the tape being guided into contact with a substantial segment of the periphery of the capstan to assure proper driving relation. The capstan determines the precise speed of the tape past the transducer.

A synchronous hysteresis electric motor 20 which is inherently of the self-starting-type, is connected to drive the capstan through a suitable belt and pulley drive connection 21, which is shown schematically, thus during normal operation of the motor at its synchronous speed the capstan is rotated at a corresponding predetermined speed which produces the desired constant velocity of the tape past the transducer.

In order to operate at a nonsynchronous speed significantly lower than synchronous speed, such as in a recording device which provides for self-threading, the present invention provides a separate power supply for the synchronous motor.

Referring to FIG. 2, the motor 20 is provided with forward and reverse coils, marked with appropriate legends, which are alternately energized to rotate the motor in forward or reverse directions, and thus to move the tape from the supply to the takeup or in the opposite direction as desired. The electrical power supply is indicated schematically at 25 and is connected through a normal running circuit including line 26 and the speed selector means 28. This means may be in the form of a double-pole single-throw mechanical switch as illustrated, or may be in the form of any suitable electronic or electrical switching device as may be desired. The normal running circuit also includes the forward-reverse selector means 30, which likewise may be in the form of the mechanical double-pole double-throw switch shown, or an equivalent electrical or electronic switching device. The mechanical switches in the diagram are shown completing the normal synchronous speed circuit for forward operation of the motor.

The slow speed power circuit to the motor is connected by actuating the selector means 28 to complete a circuit through line 32 and an interrupter means 33 which is controlled by a feedback device responsive to the motor speed. The interrupter 33 conveniently is in the form of a normally closed switch which has an internal spring load tending to hold it in its closed position. The actuator arm of leaf 34 of this switch extends into contact with a governor mechanism 35, details of which are shown in FIGS. 3 and 4.

The rotor shaft 37 of the motor 20 has fastened to it a spindle 40 which is provided with a cross passage 42 receiving the flyweight arm 43, and this arm is pivotally mounted about a transverse axis through a crosspin 44. A cam 45 is formed on the arm 43 slightly to one side of the crosspin 44, and this cam engages an actuator pin or rod 47. The pin 47 is slidably mounted in the hub 40 along its axis of rotation and extends upward into engagement with the switch actuator arm 34.

The internal spring load of the switch 33 normally is sufficient to push pin 37 downward against cam 45, thus at rest, and at speeds below the desired low speed motor operation, the flyweight arm 43 is urged to the position shown in dotted lines in FIG. 3. The positions of the pin and cam are shown in the "at rest" position in full lines in FIG. 4.

As the motor 20 reaches a predetermined speed at which the flyweight 43 will rotate about its crosspin, the flyweight will move to the position shown in full lines in FIG. 3, since the ends of the flyweight arm will tend to assume the largest radius that they can attain. This causes cam 45 to push upward on the pin 47, opening the switch 33 and thus interrupting the low speed power supply to the motor. As the motor slows, for example due to the load upon it, the flyweight arm will return to its dotted line position, and switch 33 will again close. By appropriate selection of the length and mass of the flyweight arm, it is possible to have the flyweight move between these two positions over a relatively small range of speed difference. This permits the interrupter in the low speed circuit to open and close again at speeds which are fairly close to each other, for example in the order of 20 r.p.m. difference, thus it is possible to operate the synchronous motor at this lower speed, which is essentially the actuating speed of the flyweight arm 43, without noticeable hunting.

The lower speed obviously is nonsynchronous, but is adequately controlled for its purpose.

FIG. 5 illustrates a modification in the low speed control circuit, wherein an interrupter 33a is provided in the form of a solid-state switching device, i.e., a switching semiconductor, which is connected into the slow speed circuit included in line 32. The solid-state switching device is controlled by a conventional switching circuit 50 which will switch the device off and on to perform the desired interrupting function. In this case the synchronous motor 20 is connected to drive a tachometer device 52 which provides a varying control signal to the switching circuit depending on the speed of the motor. At a predetermined speed the switching circuit will cause the semiconductor to interrupt the slow speed power supply circuit, so as to diminish (by cutting off part of each half cycle) or to cut off completely (momentarily) the power supply to the motor. With this modification the motor can be run at an essentially constant slower speed than its synchronous speed.

While the forms of apparatus herein described constitute preferred embodiments of the invention, it is to be understood that the invention is not limited to these precise forms of apparatus, and that changes may be made therein without departing from the scope of the invention which is defined in the appended claims.

What we claim is:

1. In a magnetic recording system having a supply and a takeup for the recording media, means for guiding the media from the supply to the takeup along a predetermined path, at least one transducer mounted along said path for cooperation with said media, a rotatable capstan mounted along said path and arranged to drive the media, and a synchronous electric motor of the self-starting-type connected to drive said capstan at a predetermined normal speed, the improvement comprising,
   a normal power supply circuit arranged to connect said motor to an electrical supply source having a frequency at which the motor operates at synchronous speed,
   a lower speed power supply circuit also arranged to supply power to said motor from the same source,
   selector means arranged to activate one or the other of said circuits,
   interruptor switch means connected and arranged in said lower speed circuit to control completely the supply of power to said motor when said selector means has activated said lower speed circuit,
   and speed responsive means driven from said motor and arranged to control said interruptor switch means to maintain said motor at a predetermined nonsynchronous speed below synchronous speed.

2. Apparatus as defined in claim 1, wherein said speed responsive means is a mechanical governor, and said interruptor switch means is a normally closed switch electrically connected in said lower speed circuit and arranged for mechanical opening by said governor to interrupt and restore said lower speed circuit repeatedly at a predetermined speed lower than synchronous speed.

3. Apparatus as defined in claim 1, wherein said speed responsive means produced a signal variable with motor speed, said interruptor switch means is an electronic switching device electrically connected to complete said lower speed circuit, and a control for said electronic switching device actuated by said speed responsive means to cause said switching device to control power applied through said lower speed circuit at a predetermined speed lower than synchronous speed.

4. A speed control for a synchronous electric motor of the self-starting-type having a field winding, a normal power supply circuit adapted to connect said winding to an alternating current power supply source of constant frequency determining the synchronous speed of the motor, a lower speed power supply circuit also adapted to connect said winding to the same power supply source, interruptor switch means in said lower speed circuit, and speed responsive means driven from said motor and arranged to actuate said interruptor switch means for repeatedly interrupting and restoring all the power through said lower speed circuit as the motor attains a predetermined nonsynchronous speed lower than synchronous speed and then slows below said lower speed.